United States Patent [19]
Roche

[11] Patent Number: 5,178,968
[45] Date of Patent: Jan. 12, 1993

[54] EXTRUDED FUEL CELL STACK SHUNT CURRENT PREVENTION ARRANGEMENT

[75] Inventor: Robert P. Roche, Cheshire, Conn.

[73] Assignee: International Fuel Cells Corporation, South Windsor, Conn.

[21] Appl. No.: 670,847

[22] Filed: Mar. 18, 1991

[51] Int. Cl.⁵ .................... H01M 2/08; H01M 8/24
[52] U.S. Cl. .................................. 429/18; 429/35; 429/36
[58] Field of Search ....................... 429/18, 35, 36

[56] References Cited

U.S. PATENT DOCUMENTS

| | | | |
|---|---|---|---|
| 4,371,433 | 2/1983 | Balko et al. | 429/18 |
| 4,786,568 | 11/1988 | Elmore et al. | 429/35 |
| 5,079,104 | 1/1992 | Roche et al. | 429/36 |
| 5,096,786 | 3/1992 | Granata et al. | 429/35 |

FOREIGN PATENT DOCUMENTS

| | | | |
|---|---|---|---|
| 10564 | 1/1985 | Japan | 429/35 |
| 10565 | 1/1985 | Japan | 429/35 |

Primary Examiner—Wayne Langel
Attorney, Agent, or Firm—Peter R. Ruzek

[57] ABSTRACT

A fuel cell stack includes a plurality of fuel cells juxtaposed with one another in the stack and each including a pair of porous plate-shaped anode and cathode electrodes that face one another, and a quantity of liquid electrolyte present at least between the electrodes. A separator plate is interposed between each two successive electrodes of adjacent ones of the fuel cells and is unified therewith into an integral separator plate by forcing most of a quantity of an electrolyte-nonwettable material, which is originally introduced into the respective interface as a sheet of such material, into the pores of the respective electrodes. A circumferentially complete barrier that prevents flow of shunt currents onto and on an outer peripheral surface of the separator plate is formed by extruding the remainder of the electrolyte-nonwettable material out of the respective interface. This carrier also prevents cell-to-cell migration of any electrolyte that may be present at the outer periphery of the integral separator plate while the latter is incorporated in the fuel cell stack.

14 Claims, 2 Drawing Sheets

EXTRUDED FUEL CELL STACK SHUNT CURRENT PREVENTION ARRANGEMENT

DESCRIPTION

1. Technical Field

The present invention relates to fuel cell devices in general, and more particularly to an arrangement for avoiding the flow of shunt currents at the periphery of a fuel cell stack.

2. Background Art

There are already known various constructions of fuel cell devices, most if not all of which include a multitude of individual fuel cells that are arranged in fuel cell groups or stacks. As is well known, each such fuel cell includes an anode, a cathode, and a quantity of electrolyte or another ion transfer or exchange medium that is present at least between (and often also within) the anode and the cathode. Then, as hydrogen (or another gaseous fuel) and oxygen (as such or as an ingredient of air) are supplied to the anode and the cathode, respectively, an electrochemical reaction takes place in each of such individual fuel cells, resulting in the formation of water as the reaction product, with attendant creation of electrical potential difference between the anode and the cathode that is then utilized, ordinarily in conjunction with that created in the other fuel cells, to supply electric power to an external user device or circuit.

Often, but not always, the reactants (fuel and oxygen-carrying medium) are supplied to regions of the electrodes that are situated at opposite major surfaces of such electrodes from those facing the electrolyte. Under these circumstances, at least the effective region of each anode and of each cathode has a porous structure to allow penetration of at least the respective gaseous reactant therethrough from the respective gaseous medium supply side to the areas at which the desired, usually catalytically promoted, electrochemical reaction takes place in the presence of the electrolyte. The individual fuel cells of the fuel cell stack are typically separated from one another by respective separator plates that are interposed between the fuel cells and are usually electrically conductive but, to the extent possible, impervious both to liquids and gases.

Experience especially with fuel cell devices employing acid electrolytes has shown that some of the electrolyte is lost during the operation of the device. Primarily for this reason, each of the fuel cells is initially charged with a quantity of electrolyte that is in excess of that needed at the outset of the fuel cell device operation but is sufficient for sustaining the operation of the device for an extended period of time, such as for 40,000 hours, despite the electrolyte losses. The excess electrolyte is usually accommodated in one or both of two porous plate-shaped structures of each fuel cell that constitute or are provided with the respective anode and cathode electrodes, so that such structures are sometimes referred to as electrolyte retention plates.

Various measures are then taken to minimize the amount of electrolyte escaping from the individual fuel cells. One of such measures involves the sealing of all the passages through which the electrolyte could escape from the fuel cells. This includes not only sealing the interfaces between the adjacent ones of the various components (cathodes, anodes, separator plates, etc.) of the fuel cell stack, but often also the plugging of the pores of the anode and the cathode components at the edge regions thereof. However, it was discovered that, despite all precautions, some electrolyte still reaches the outer periphery of the fuel cell stack. Then, in view of the fact that the separator plates are usually made of a material that is capable of being wetted by the electrolyte, this escaping electrolyte also wets the outer periphery of the respective separator plate.

This has basically two disadvantageous consequences. For one, it results in electrolyte migration through the fuel stack in the course of operation of the latter. More particularly, it was discovered that, over the useful operating life of a fuel cell device consisting of a stack of juxtaposed fuel cells separated from each other by respective separator plates and employing a liquid electrolyte, the electrolyte concentration and/or amount in the fuel cells, which is originally substantially uniform throughout the stack, gradually changes to a substantially increased value at one end of the stack and a substantially decreased value at the other end of the stack, with the values for the fuel cells situated between such ends gradually decreasing from the one end to the other. This eventually results in electrolyte flooding of the cell or cells situated at or near the one end, and in drying out of the affected fuel cell or cells at or near the other end of the stack. Each of these conditions is equally undesirable in that it has a deleterious effect on the performance of the affected fuel cell and may even result in premature deterioration or even complete destruction thereof.

The other of the aforementioned disadvantageous consequences is the electrolyte present on the peripheral surface of the separator plate forms at least one path of relatively low electrical resistance, thus rendering it possible for electrical shunt current to flow at such surface and thus cause or contribute to corrosion at the peripheral region of the fuel cell stack.

At first, it was assumed, quite correctly, that the aforementioned electrolyte migration was attributable to the less than perfect imperviousness of the separator plates to the passage of liquid therethrough in that the electrolyte was driven by electrical forces existing in the fuel cell stack through the respective separator plates in the direction from the other end to the one end of the stack. However, more recently, it was established that electrolyte migration occurs even when the separator plates are highly or completely impervious to the electrolyte, and even when the electrolyte is prevented from reaching the separator plate within the fuel cell in the first instance. This led to the conclusion, confirmed by observation, that it is the escaping electrolyte present at the periphery of the stack that travels on the peripheral surface of the respective separator plate from one to the next adjacent fuel cell and so on in succession, being propelled by the aforementioned electrical forces.

Even those fuel cell stack constructions that employ so-called integral separator plates are not immune to the above problems. As is known, an integral separator plate is a structure basically consisting of a separator plate proper and respective electrolyte retention plates or electrodes adjoining and secured to the separator plate in juxtaposition with the respective major surfaces thereof, each of such electrodes forming a part of a different fuel cell upon assembly of the fuel cell stack. The above problems exist in this construction even if, as is often the case, a sheet of electrolyte-impermeable and usually electrolyte-nonwettable material is interposed during the assembly of the integral separator plate between the major surface of the separator plate and the active area of the respective electrolyte retention plate, followed by application of pressure and/or heat to the assembly to cause the material of the sheet to penetrate into the pores of the electrolyte retention plate to a depth sufficient to prevent the electrolyte from reaching the separator plate, while simultaneously achieving the required good electrical contact between the respective electrolyte retention plate and the separator plate due to the removal of such material from the contact areas. Even here, however, even though the interfaces between the electrolyte retention plates and the separator plate of the unitary integral separator plate are, for all intents and purposes, completely sealed by the sheet material, some electrolyte is still able to reach the outer periphery of the respective fuel cells, cross over to the outer peripheral surface of the separator plate and wet the same.

Accordingly, it is a general object of the present invention to avoid the disadvantages of the prior art.

More particularly, it is an object of the present invention to provide a fuel cell device consisting of a stack of juxtaposed individual fuel cells containing a liquid electrolyte and separated from one another by respective separator plates, which device does not possess the disadvantages of the known devices of this kind.

Still another object of the present invention is so to develop the fuel cell device of the type here under consideration as to avoid cell-to-cell electrolyte migration and edge region corrosion due to electric shunt currents.

It is yet another object of the present invention to design an electrolyte migration prevention arrangement for the fuel cell device of the above type in such a manner as to be relatively simple and inexpensive to produce and yet reliable in operation.

A concomitant object of the present invention is to devise a process that is excellently suited for manufacturing fuel cell devices equipped with the electrolyte migration preventing arrangement of the above kind.

DISCLOSURE OF THE INVENTION

In keeping with these objects and others which will become apparent hereafter, one feature of the present invention resides in an integral separator plate for use in a fuel cell stack that includes a plurality of juxtaposed fuel cells. The integral separator plate includes a plate-shaped porous anode for one, and an a plate-shaped cathode electrode for another, of adjacent ones of the fuel cells. A separator plate is interposed between the electrodes and delimits respective interfaces with them. The separator plate is unified with the electrodes into the integral separator plate by respective quantities of electrolyte-nonwettable material each initially present in one of the interfaces in the form of a sheet and most of it being ultimately contained in respective pores of that of the electrodes that adjoins the one interface. A circumferentially complete barrier that prevents flow of electric shunt current in the fuel cell stack between the successive electrodes on an outer peripheral surface of the separator plate of the integral separator plate is constituted by an extruded part of the quantity of the electrolyte-nonwettable material situated at the respective interface.

According to another aspect of the present invention, there is provided a method of fabricating an integral separator plate for use in a fuel cell stack that includes a plurality of juxtaposed fuel cells, this method including first forming an assembly including a plate-shaped porous anode for one, and an a plate-shaped cathode electrode for another, of adjacent ones of the fuel cells, a separator plate interposed between the electrodes and delimiting respective interfaces therewith, and respective sheets of electrolyte-nonwettable material each contained in one of the interfaces. This method further includes simultaneously unifying the separator plate with the electrodes into an integral separator plate and forming a substantially circumferentially complete barrier to flow of electric shunt current in the fuel cell stack between the successive electrodes on the outer peripheral surface of the separator plate of the integral separator plate. This includes causing most of the electrolyte-nonwettable material of the respective sheet to flow into respective pores of that of the electrodes that adjoins the respective interface, and extruding the remainder of such electrolyte-nonwettable material out of the respective interface to form the barrier thereat.

BRIEF DESCRIPTION OF THE DRAWING

The present invention will be described in more detail below with reference to the accompanying drawing in which.

BEST MODE FOR CARRYING OUT THE INVENTION

Figure 1:
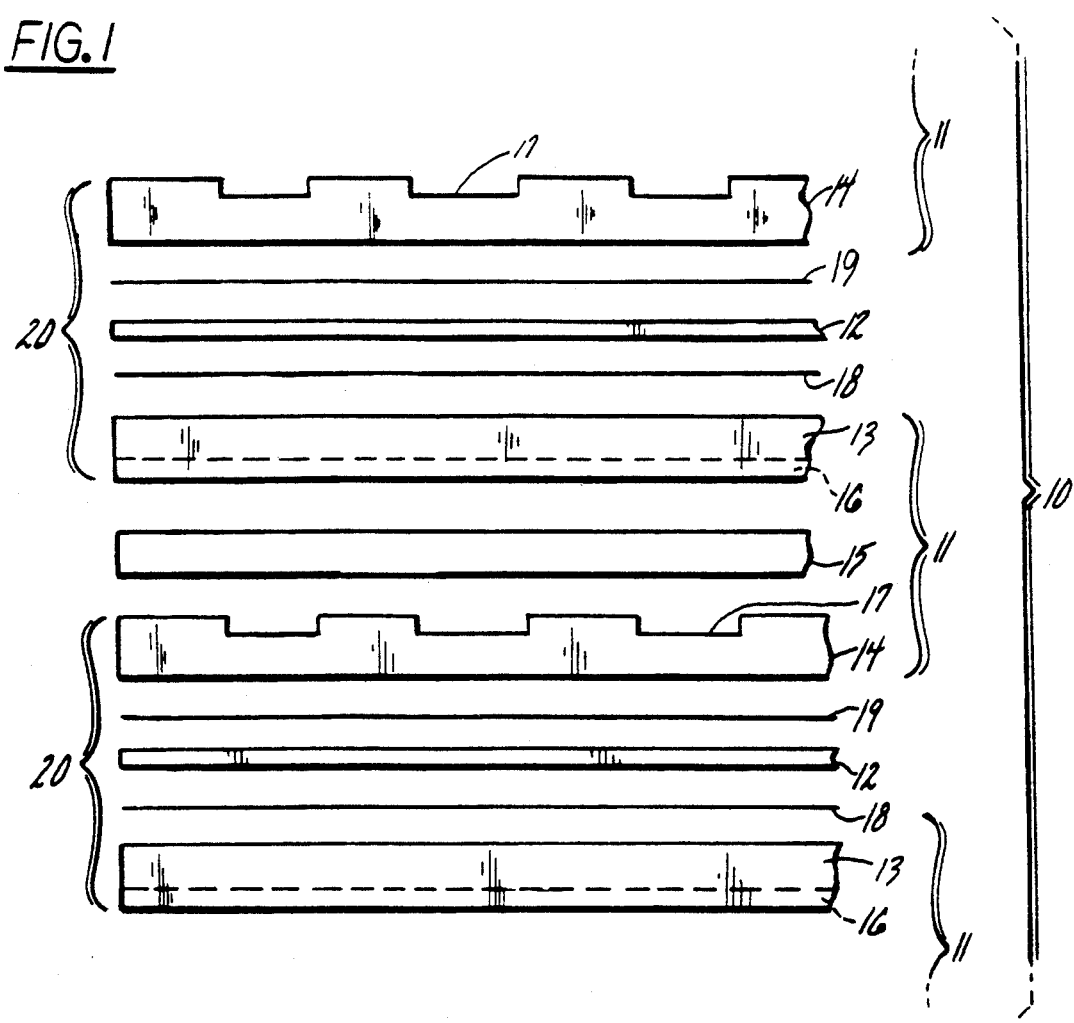
FIG. 1 is a somewhat simplified exploded view of a fragment of a fuel cell stack including components needed for the fabrication of integral separator plates embodying the present invention.

Referring now to the drawing in detail, and first to FIG. 1 thereof, it may be seen that the reference numeral 10 has been used therein to identify a fuel cell stack of a fuel cell device that is of a known construction so that it that need not be explained here in detail. Suffice it to say that the stack 10 includes a plurality of individual fuel cells, denoted as 11 without differentiation therebetween, which are juxtaposed with one another (usually superimposed as shown) and are separated from each other by respective separator plates, each being identified by the reference numeral 12.

The fully depicted fuel cell 11 (and, similarly, each of the other fuel cells 11 of the stack 10) includes, as its basic components, an anode electrode 13, a cathode electrode 14, and an electrolyte body 15 disposed between the electrodes 13 and 14. In the illustrated fuel cell structure, the electrolyte body 15 is constructed as a solid material plate, such as a porous electrolyte-retaining matrix. However, it is to be mentioned at this juncture that the construction of the individual fuel cells 11 is depicted in the drawing only in such a detail as is necessary for understanding the present invention and to the extent needed to explain the principles of construction and operation of the fuel cells 11 and of the fuel cell stack 10 including the same, and that the actual construction of the fuel cells 11 may vary from that depicted. So, for instance, catalyst layers that are typically present at the interfaces between the electrodes 13 and 14 and the electrolyte matrix 15, and that can be constructed as separate plates or sheets or as layers applied either to the electrodes 13 and 14, or to the electrolyte matrix 15, or to both, have been omitted from the drawing. Furthermore, the electrodes 13 and 14 have been shown to be provided, at their regions facing the electrolyte matrix 15, with respective channels 16 and 17 serving to distribute gaseous fuel (such as hydrogen) and oxygen (alone or as a constituent component of air) over the anode electrode 13 and the cathode electrode 14, respectively. For reasons that will be explained in more detail later, the electrodes 13 and 14 are usually initially porous throughout so that the electrolyte can enter, be retained in, or flow through them.

As also illustrated in FIG. 1, which is an exploded view showing the various components of the fuel cell stack 10 as they exist prior to the stack assembly, sheets 18 and 19 are interposed between the anode electrode 13 and the separator plate 12, and the latter and the cathode electrode 14, respectively. The sheets 18 and 19 are of a material that, in its final form or condition as it exists in the assembled fuel stack 10, is highly resistant if not invulnerable to chemical attack by the electrolyte, and also impermeable to such electrolyte so that it prevents penetration thereof to the respective separator plate 12. Advantageously, this material is also nonwettable by the electrolyte. Fluoroethylenepropylene and similar halogenated hydrocarbon polymers are currently considered to be best suited for this purpose.

In the process of making the fuel cell stack 10 embodying the present invention, a unitary structure 20, often referred to as integral separator plate, is formed prior to the assembly of the stack 10. The integral separator plate 20 includes, in addition to the separator plate 12 proper, the anode electrode 13 which is to belong to one, and the cathode electrode 14 that is to belong to another, adjacent, fuel cell 11 upon assembly of the stack 10. The unitary character of the integral separator plate 20 is obtained by applying pressure and/or heat to an assembly of the integral separator plate components 12 to 14, 18, and 19 that have been previously juxtaposed and properly aligned with one another in the orientation and succession indicated in FIG. 1 of the drawing. In the course of this operation, the material of the respective sheet 18 or 19 is compressed between the separator plate 12 and the respective electrode 13 or 14 and is forced into the pores thereof to a certain penetration depth that depends on the thickness of the respective sheet 18 and 19 and the degree of porosity of the respective electrode 13 or 14 but, in any event, to only a relatively small fraction of the total thickness of the respective electrode 13 or 14, thus plugging such pores in the vicinity of the separator plate 12 but leaving the remainder of the pores unobstructed and thus capable of receiving the electrolyte. The sheet material also adheres to the separator plate 12, thus joining the respective electrode 13 or 14 thereto. When this operation is completed, good electrical contact, which is needed for the fuel cell stack 10 to operate as intended, exists between the separator plate 12, the associated anode electrode 13 on the one hand, and the associated cathode electrode 14 on the other hand, in that the sheet material, which usually exhibits a high degree of electrical resistivity, is pushed out of the way from the areas of electrical contact.

It will be appreciated that, when the stack 10 is in its assembled condition, the electrolyte body 15 contains a quantity of a liquid electrolyte sufficient for an electrochemical reaction, during which oxygen and fuel are combined with one another to form product water, to take place in the respective fuel cell 11, with attendant creation of an electrical potential difference between the anode and cathode electrodes 13 and 14. The separator plate 12 is electrically conductive to provide electrical connection between the adjacent or successive ones of the fuel cells 11 in the stack 10, but it and/or at least the area of the respective electrode 13 or 14 that immediately adjoins it, is as impermeable to liquids and gases as possible, for instance, due to the presence of the material of the respective sheet 18 or 19 thereat, not only to prevent passage of the gaseous fuel or oxygen therethrough with attendant formation of a highly combustible gas mixture, but also to avoid migration of the electrolyte between the individual fuel cells 11 of the stack 10, which is driven or enhanced by the aforementioned electrical potential differences.

Experience has shown that, despite all precautions that are taken to avoid electrolyte loss, some electrolyte still manages to escape from the individual fuel cells 11 during the operation of the fuel cell device and leave the stack 10 after it has reached the periphery thereof or other surfaces at which it comes into contact with any gaseous medium, such as by evaporating into the respective gaseous medium. To make up for this loss and thus to make sure that the fuel cell device is able to operate over an extended operating period, it is currently customary to originally charge each of the fuel cells 11 with more than the above electrolyte quantity that is required to be present in the electrolyte body 15. The additional amount is then typically accommodated in at least one of the electrodes 13 and 14 which, as mentioned above, are porous, so that the respective electrode 13 or 14 doubles as a replenishment electrolyte retaining body from which electrolyte is gradually drawn into the electrolyte body 15 to replenish the electrolyte amounts lost therefrom over the operating lifetime of the fuel cell device.

It was determined that the aforementioned cell-to-cell electrolyte migration, if not reined in, has a deleterious or even destructive effect on the fuel cell device and its operation, in that it ultimately results in drying out of the fuel cell or cells 11 situated at one end of the stack 10 and in flooding of the cell or cells 11 disposed at the other end of the stack 10, and that it occurs in the fuel cell device as described so far even if the aforementioned measures are taken to assure that the separator plate 12 is completely impervious to the electrolyte. It was realized that such residual electrolyte migration is attributable to the fact that some electrolyte is able to reach the peripheral surface of the fuel cell 11, be it through respective ordinarily sealed interfaces, or through the pores of the respective electrodes 13 and 14 or other components of the fuel cell 11, and wick its way upon the outer peripheral surface of the separator plate 12 to the adjacent fuel cell 11, and so on in succession. It was also realized that, once the electrolyte establishes a continuous path extending between the interfaces 18 and 19 on any region of or all over the outer peripheral surface of the separator plate 12, it electrically bridges the gap between the adjacent fuel cells 11 and conducts electric shunt current which then causes or contributes to corrosion at the outer periphery of the fuel cell stack 11 and especially on the outer peripheral surface of the separator plate 12.

Based on the above realizations, it is proposed in accordance with the present invention to provide at least one barrier 21 of a material that is nonwettable by the electrolyte at the periphery of the integral separator plate 20, this barrier 21 being situated at least at the region of one interface between the separator plate 12 and one of the electrodes 13 or 14 and extending over substantially the entire periphery of the respective integral separator plate 20. However, it is currently preferred to provide the barrier 21 at each of the interfaces between the separator plate 12 and the electrodes 13 and 14. To this end, as can also be perceived from FIG. 1 of the drawing, the sheets 18 and 19 are dimensioned so as to be substantially coextensive with the separator plate 12, and thus with the electrodes 13 and 14, prior to the above-mentioned pressing operation. This results in a situation where, during the pressing operation, the sheet material, due to its tendency to flow in the directions of least resistance, will be extruded out of the interface and form the aforementioned barrier 21 at the outer periphery of the integral separator plate 20. However, it should be appreciated that the sheets 18 and 19 need not be exactly coextensive with the separator plate 12 and the electrodes 13 and 14. Rather, they could initially extend beyond, or even terminate short of, the outer edges of the respective separator plate 12, it only being necessary in the latter instance to insure that a sufficient amount of excess sheet material be present in the respective interface close enough to such edges to form the barrier 21 of a sufficient size or surface area.

Then, in the assembled stack 10, this extruded material forming the barrier 21, owing to its nonwettability, interrupts the path along which the electrolyte could otherwise creep from one of the fuel cells 11 to the adjacent one, and so on in sequence, thus interfering with and completely preventing cell-to-cell electrolyte migration, while simultaneously preventing the leaking electrolyte from forming the aforementioned electrical path through which the electrical shunt current would otherwise flow, with the attendant deleterious corrosive effect. It stands to reason that the barrier 21 is to be present at all four of the edge regions of the separator plate 12, so as to completely interrupt any path along which the electrolyte could possibly creep between the adjacent or successive fuel cells 11 over the outer peripheral surface of the separator plate 12. It is also self-evident that the barrier 21 has to have a surface area of a width as considered in the directions of possible electrolyte and/or shunt current flow paths that is sufficient to prevent the electrolyte from forming such paths on a permanent, and preferably even on an intermittent, basis.

Figure 2:
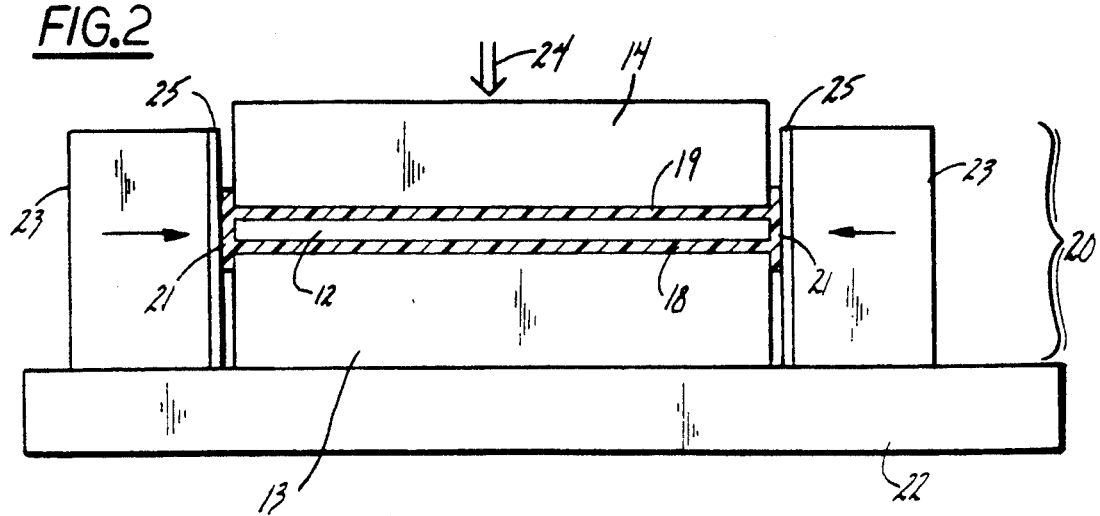
FIG. 2 is a side elevational view of an integral separator plate of the present invention and of an apparatus for fabricating the same from the components depicted in FIG. 1.

FIG. 2 of the drawing indicates one way in which such a peripherally continuous nonwettable barrier 21 can be formed in accordance with the present invention. In this case, the barrier 21 is applied to the outer peripheral surface of the respective separator plate 12 in the form of a coating layer, preferably during the formation of the integral separator plate 20 and in any event prior to the inclusion of the latter in the stack 10. To form the two barriers 21, the components 13, 18, 12, 19 and 14 of the integral separator plate 20 that is to be fabricated are placed, in the proper order, orientation and juxtaposition, on a support 22, and respective side rails 23 are positioned next to the respective ones of the four sides of the thus formed precursor of the integral separator plate 20. Each of the side rails 23 is then pressed, as indicated by respective arrows, with a predetermined force against the respective side surface of the integral separator plate precursor 20, and pressure is exerted in any known manner, as indicated by an arrow 24, on the top electrode 14. This pressure has such a magnitude, and is exerted while the precursor 20 is at such a temperature, that the material of the sheets 18 and 19 not only is forced to flow to the desired depth into the pores of the respective electrodes 13 and 14 but also is extruded out of the respective interfaces between the electrodes 13 and 14 and the separator plate 12. With nowhere else to go, this extruded material is then diverted by the respective side rail 23 to flow into the interface, as minuscule as it may be, existing between such side rail 23 and the outer surface of the separator plate 12 and/or the respective electrode 13 or 14, thus forming a relatively thin electrolyte nonwettable layer or skin thereon, this layer constituting the barrier 21 after the completion of this pressing or integral separator plate formation operation.

The above operation has to be conducted under conditions that will assure that the material of the sheets 18 and 19 will indeed behave in the aforementioned manner. When fluoroethylenepropylene (such that marketed by E. I. Dupont & Co. as Teflon TM FEP) is chosen to constitute such material, it has been found to be advantageous to use sheets of such material with a sheet thickness of about 0.005 inch, and to conduct the pressing operation at a temperature of about 620° F. (at which the sheet material is in its molten state) and to exert substantially uniformly distributed pressure in the range between 50 and 400 psi against the top electrode 14. The side rails 23 are pressed against the precursor 20 with a substantially uniformly distributed pressure in the range substantially between 1 and 2 psi. This pressure can be applied to the side rails 23 via screws or similar elements exhibiting relatively low yieldability, or via springs or other resilient elements.

According to the invention, the bulk of each of the side rails 23 may be made of graphite. However, to facilitate or enable separation of the side rails 23 from the integral separator plate 20 after the completion of the above pressing operation, each of the side rails 23 is preferably provided, at least on its surface facing the precursor or integral separator plate 20, with a layer 25 of a release material having no or only low affinity to the extruded sheet material. It is currently preferred to use a polyimide material, such as that commercially available from E. I. Dupont de Nemours &. Co. under the designation Kapton TM, as such release material. Inasmuch as the extruded sheet material does not adhere to the release material, it is easy to move the side rails 23 away from the integral separator plate 20 after the completion of the pressing operation, without destroying or otherwise damaging the barrier layer 21.

Dye penetrant tests conducted using integral separator plates 20 provided with the peripherally complete nonwettable barrier layer 21 obtained in the above-described manner have confirmed that the layer 21, if not damaged, such as during subsequent handling of the thus formed integral separator plate 20, constitutes a perfect barrier against cell-to-cell electrolyte migration over the outer periphery of the separator plate 12.

Figure 3:
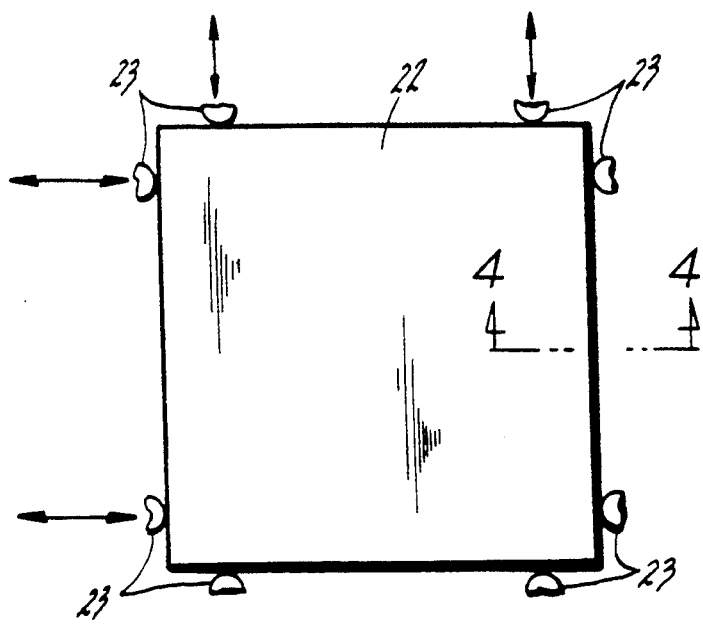
FIG. 3 is a top plan view of an integral separator plate of the present invention and of a modified apparatus for fabricating the same from the components shown in FIG. 1.
Figure 4:
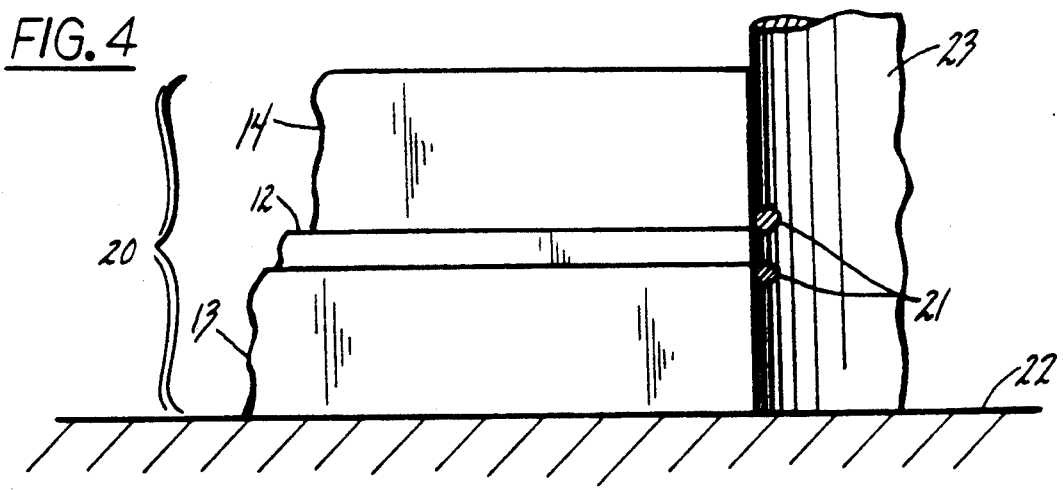
FIG. 4 is a somewhat enlarged side elevational view of a fragment of an integral separator plate fabricated in the apparatus of FIG. 3.

Experience has shown that it is not always necessary for the barrier 21 to take the form of a layer or skin on the respective outer surface of the separator plate 12 and/or the electrodes 13 and 14 of the integral separator plate 20; rather, the barrier 21 can be constituted by a bead or similar formation of the extruded sheet material. In this instance, an arrangement of the type depicted in FIG. 3 of the drawing, in which the same reference characters as before have been used to identify corresponding parts, can be used, in accordance with another aspect of the present invention, to form the substantially circumferentially complete barrier or barriers 21 of the integral separator plate 20. As shown there, the integral separator plate precursor 20 is confined, during the pressing operation that is conducted under conditions similar or identical to those mentioned above, between respective retaining members 23 extending substantially perpendicularly to the major surfaces of the integral separator plate 20, rather than parallel thereto. The surfaces of the retaining members 23 that face toward the precursor 20 are preferably rounded to minimize the area of contact between the retaining members 23 and the precursor 20 to a minimum and thus to interfere only as little as possible with the extrusion of the aforementioned sheet material. The retaining members or pins 23 that are arranged at two of the precursor sides (at the right and at the bottom as seen in FIG. 3) may be stationary, while the remaining pins 23 are movable in the directions of the double-headed arrows and are pressed against the precursor 20 during the pressing operation. The sheet material extruded from the respective interface is not constrained, except to a very limited extent at the locations of the pins 23, so that it will assume a substantially bead-shaped configuration like that illustrated in FIG. 4 of the drawing after its extrusion. It may be seen that the thus formed barriers 21 have a considerable effective width (as considered in the direction of the path in which the electrolyte would flow if it could cross the barrier 22) and, because of the electrolyte nonwettability of their material, they once more prevent electrolyte and/or shunt current flow. The retaining pins 23 are preferably situated at locations coinciding with those at which the respective gaseous media manifolds will be in sealed contact with the integral separator plate 20 in the fuel cell stack 10, so that any imperfections of the barrier 21 that may exist at such locations do not have any material impact on the electrolyte migration and/or electric shunt current prevention function of the barrier 21.

Figure 5:
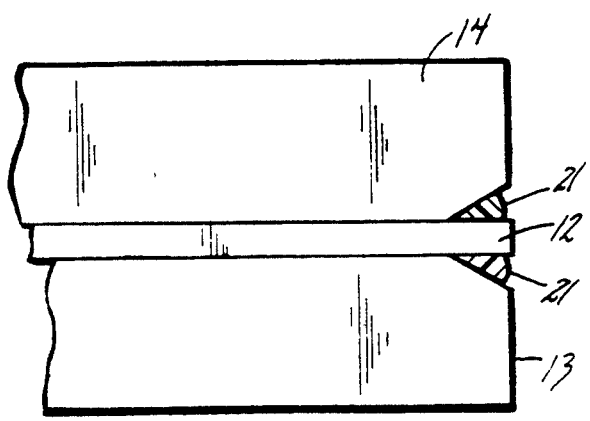
FIG. 5 is a view similar to that of FIG. 4 but illustrating a slightly modified construction of the integral separator plate.

If so desired or found to be advantageous, it is not necessary for the barrier or barriers 21 performing the above preventative function to extend beyond the outer circumferential surface of the integral separator plate 20. In this case, the arrangement of FIG. 3, for instance, can still be used during the pressing operation. However, the edge regions of the electrodes 14 and 13 (as shown in FIG. 5 of the drawing) and/or of the separator plate 12 are bevelled on all four sides, thus creating respective recesses into which the electrolyte nonwettable sheet material is free to expand after its extrusion to form the respective barriers 21.

While the present invention has been illustrated and described as embodied in a particular construction of a fuel cell device and an integral separator plate to be used therein, it will be appreciated that the present invention is not limited to this particular example; rather, the scope of protection of the present invention is to be determined solely from the attached claims.

I claim:
1. A fuel cell stack comprising a plurality of fuel cells juxtaposed with one another in the stack and each including a pair of plate-shaped porous anode and cathode electrodes that face one another, and a quantity of liquid electrolyte present at least between said electrodes;

means for supplying a gaseous fuel and oxygen to said anode electrode and said cathode electrode, respectively, of each of said pairs;

a number of separator plates interposed between respective successive electrodes of adjacent ones of said fuel cells and delimiting respective interfaces therewith, each of said separator plates having an outer peripheral surface;

means for unifying each respective one of said separator plates with at least one of said successive anode and cathode electrodes of the respective ones of said successive fuel cells into a respective integral separator plate, including a quantity of electrolyte-nonwettable material initially present in said interface between said respective separator plate and said one electrode in the form of a sheet substantially coextensive with said interface and most of it being ultimately contained in respective pores of said one electrode to prevent fluids present in said one electrode from reaching said separator plate; and means for preventing the flow of electric shunt current in said fuel cell stack between said successive electrodes on said outer peripheral surface of said respective separator plate, including a substantially circumferentially complete barrier constituted by an extruded integral part of said quantity of said electrolyte-nonwettable material that is situated at but externally of said interface to prevent the liquid electrolyte from migrating between said one electrode and said peripheral surface of said separator plate.

2. The fuel cell stack as defined in claim 1, wherein said barrier is constituted by a layer of said electrolyte-nonwettable material on at least said outer peripheral surface of said separator plate adjacent said interface.

3. The fuel cell stack as defined in claim 1, wherein said barrier is constituted by a bead of said electrolyte-nonwettable material projecting beyond the outer periphery of said integral separator plate at said interface.

4. The fuel cell stack as defined in claim 1, wherein at least one of said separator plate and said one electrode has a beveled edge at a region thereof facing said interface to bound a receiving recess thereat; and wherein said barrier is at least partially accommodated in said receiving recess.

5. An integral separator plate for use in a fuel cell stack that includes a plurality of juxtaposed fuel cells, comprising a plate-shaped porous anode for one, and a plate-shaped cathode electrode for another, of adjacent ones of the fuel cells;

a separator plate interposed between said electrodes, delimiting respective interfaces therewith, and having an outer peripheral surface;

means for unifying said separator plate with said electrodes into the integral separator plate, including respective quantities of electrolyte-nonwettable material each initially present in one of said interfaces in the form of a sheet substantially coextensive with the respective one of said interfaces and most of it being ultimately contained in respective pores of that respective one of said electrodes that adjoins said one interface to prevent fluids present in said one of said electrodes during the use of the integral separator plate from reaching said separator plate: and means for preventing the flow of electric shunt current in said fuel cell stack between said successive electrodes on said outer peripheral surface of said separator plate of said integral separator plate, including a substantially circumferentially complete barrier constituted by an extruded integral part of at least one of said quantities of said electrolyte-nonwettable material situated at but externally of said respective interface to prevent liquid electrolyte present in at least one of the electrodes during the use of the integral separator plates form migrating between the respective one of said electrodes that adjoins said respective interface and said peripheral surface of said separator plate.

6. The integral separator plate as defined in claim 5, wherein said barrier is constituted by a layer of said electrolyte-nonwettable material on at least said outer peripheral surface of said separator plate adjacent said respective interface.

7. The integral separator plate as defined in claim 5, wherein said barrier is constituted by a bead of said electrolyte-nonwettable material projecting beyond the outer periphery of said integral separator plate at said respective interface.

8. The integral separator plate as defined in claim 5, wherein at least one of said separator plate and that one of said electrodes that delimits said respective interface therewith has a beveled edge at a region thereof facing said respective interface and to bound a receiving recess thereat; and wherein said barrier is at least partially accommodated in said receiving recess.

9. A method of fabricating an integral separator plate for use in a fuel cell stack that includes a plurality of juxtaposed fuel cells, comprising the steps of forming an assembly including a plate-shaped porous anode for one, and a plate-shaped cathode electrode for another, of adjacent ones of the fuel cells, a separator plate interposed between the electrodes, delimiting respective interfaces therewith, and having an outer peripheral surface, and sheets of electrolyte-nonwettable material each contained in and substantially coextensive with one of the interfaces; and simultaneously unifying the separator plate with the electrodes into an integral separator plate and forming a substantially circumferentially complete barrier to flow of electric shunt current in the fuel cell stack between the successive electrodes on the outer peripheral surface of the separator plate of the integral separator plate, including causing most of the electrolyte-nonwettable material of the respective sheet to flow into respective pores of the respective one of the electrodes that adjoins the respective interface to prevent fluids present in said respective electrode during the use of the integral separator plate from reaching said separator plate, and extruding the remainder of such electrolyte-nonwettable material out of the respective interface to form the barrier that prevents liquid electrolyte present in said integral separator plate during the use thereof from migrating between that of said electrodes that adjoins said respective interface and said peripheral surface of said separator plate.

10. The method as defined in claim 9, and further comprising the step of confining the flow of the electrolyte-nonwettable material following the extrusion thereof in such a manner as to form the barrier as a layer of said electrolyte-nonwettable material covering at least a circumferentially complete portion of the outer peripheral surface of the separator plate.

11. The method as defined in claim 9, wherein said simultaneous unifying barrier forming step includes applying opposing equal pressures to the integral separator plate assembly in directions substantially normal to the respective interfaces.

12. The method as defined in claim 11, wherein said pressures are in the range substantially between 50 and 400 psi.

13. The method as defined in claim 11, and further comprising the step of maintaining the integral separator plate assembly at a temperature at which the electrolyte-nonwettable material is in its molten state at least during said applying step.

14. The method as defined in claim 13, wherein the electrolyte-nonwettable material is fluoroethylenepropylene; and wherein said temperature is about 620° F.

* * * * *